June 12, 1951 C. S. SZEGHO ET AL 2,556,455

CATHODE-RAY TUBE FOCUSING SYSTEM

Filed March 2, 1948 2 Sheets-Sheet 1

Inventor
CONSTANTIN S. SZEGHO
THOMAS G. POLANYI
By Paul Kolisch
Attorney

Inventor
CONSTANTIN S. SZEGHO
THOMAS G. POLANYI
By Paul Kolisch
Attorney

Patented June 12, 1951 2,556,455

UNITED STATES PATENT OFFICE 2,556,455

CATHODE-RAY TUBE FOCUSING SYSTEM

Constantin S. Szegho and Thomas G. Polanyi, Chicago, Ill., assignors to The Rauland Corporation, Chicago, Ill., a corporation of Illinois Application March 2, 1948, Serial No. 12,628

5 Claims. (Cl. 315—31)

This invention relates to improvements in apparatus for focusing the electron beam of a cathode ray device. More particularly, it relates to improvements in circuits for automatically monitoring and correcting the electron beam focus of such a device.

The present invention is an improvement on the invention described in my copending application Serial No. 725,459, filed January 31, 1947.

It is well known that the degree of image analysis and picture resolution which can be achieved with television apparatus employing cathode ray devices depends largely upon the accuracy with which the electron beams thereof can be focused and kept in focus. The importance of good focusing becomes greater when there is picture enlargement either through projection or through the use of a tube having a large size direct viewing screen. In addition in the case of large size direct viewing tubes there is the added consideration of securing optimum focus at all points on its large screen. As the television art progresses it becomes more and more important that means be devised for continuously and automatically controlling beam focus.

In general according to this invention a focus sampling fluorescent area is included in the target region of a cathode ray device whether it be a device for picking up images or for reproducing them. During sampling intervals the area will be scanned by the electron beam and will emit light whose average intensity will vary in a predetermined manner if the stream of electrons is defocused. During defocusing the stream of electrons will be diffused to energize a larger area of the sampling fluorescent screen with a bombardment of reduced density per unit area of beam impingement. The fluorescent material and operating conditions employed are selected so that beam current density per unit area before defocusing and diffusion is greater than that at which the fluorescent material saturates, i. e. the density per unit area has passed the point where brightness increases significantly with further increases thereof. Hence the light emissions per unit area of the enlarged spot, upon defocusing, will be as bright as those of the smaller spot before defocusing. Since the larger spot will have more activated unit areas, the total light will increase. A light sensitive device is employed to monitor changes in light emissions from the sampling fluorescent area. It will respond to changes therein translating them into electrical signals. These signals control circuits for altering the operating conditions of the focusing apparatus used in the cathode ray device in an appropriate manner to compensate for the defocusing. For example, in an electrostatic kinescope the values of one or more potentials polarizing one or more focusing electrodes of the kinescope will be adjusted. In a magnetically focused cathode ray device it is the magnitude of the focusing coil current which is adjusted.

While in preferred embodiments there may be employed for the sampling area a fluorescent material which normally is saturated, this is not essential. A fluorescent substance may be employed which will not emit any significant amount of light when, during defocusing and diffusions, the electron density per unit area drops below a predetermined value. The control circuits, of course, will be arranged accordingly. In addition a mixture of fluorescent substances can be used. Where a first fluorescent substance which saturates at a current density per unit area well below the normal operating level and produces light of a first given color is mixed with a second substance which does not saturate at that normal operating level and produces light of different color, a condition will be attained in which defocusing would cause the light emissions of the first to increase significantly with respect to those of the second to vary the mixed color of their emissions. Where this type of sampling fluorescent area is employed an operator will be able to judge the condition of focus by the color of the light emissions from the sampling area.

Where this type of material is used for the sampling fluorescent area the light sensitive device should, in a preferred embodiment, include a filter adapted to pass light of the color of the emissions which do increase with defocusing.

In any of the presently existing television systems there are time intervals which occur between the high frequency sweeps in which the electron beam is blanked out to eliminate visible indications of retraces. A portion of each of these intervals of unused time may be employed for sampling instantaneously existing focusing conditions. Sampling in this way may occur either before or after each high frequency sweep.

If desired, the focus correcting process may be made fast enough to make focus adjustments during a fraction of the time required to scan one frame, but its speed will be limited partly by the delay time of the fluorescent material (usually the greater part of the light energy is released after the beam is no longer exciting the area) and partly by the time constants of certain elements of the control circuits. On the other hand for ordinary purposes the correcting process may be made relatively much slower.

In any case each corrected condition of focus should have a duration at least equal to the time required for one high frequency scan. This is true since each correction resulting from a sampling of focus made at the end of one high frequency scan must serve at least until the next sampling, i. e. must serve during the next line scan or each correction resulting from a sampling of focus made at the beginning of a line must serve for the remainder of it.

Where desired the electron beam may be intensity modulated, during sweeps across the sampling fluorescent area, by locally produced square wave pulses of adjustable amplitude. By adjusting these pulses the condition can be attained wherein the fluorescent area is saturated and its light emissions will be constant except for variations caused by defocusing. This, of course, is in contrast to the light emissions which come from the image surface of a fluorescent screen and vary principally as a result of picture intensity variations.

Other objects, features and advantages of this invention will be apparent to those skilled in the art from the following detailed description of certain illustrative embodiments and from the drawings, in which.

Figures 4, 4A:
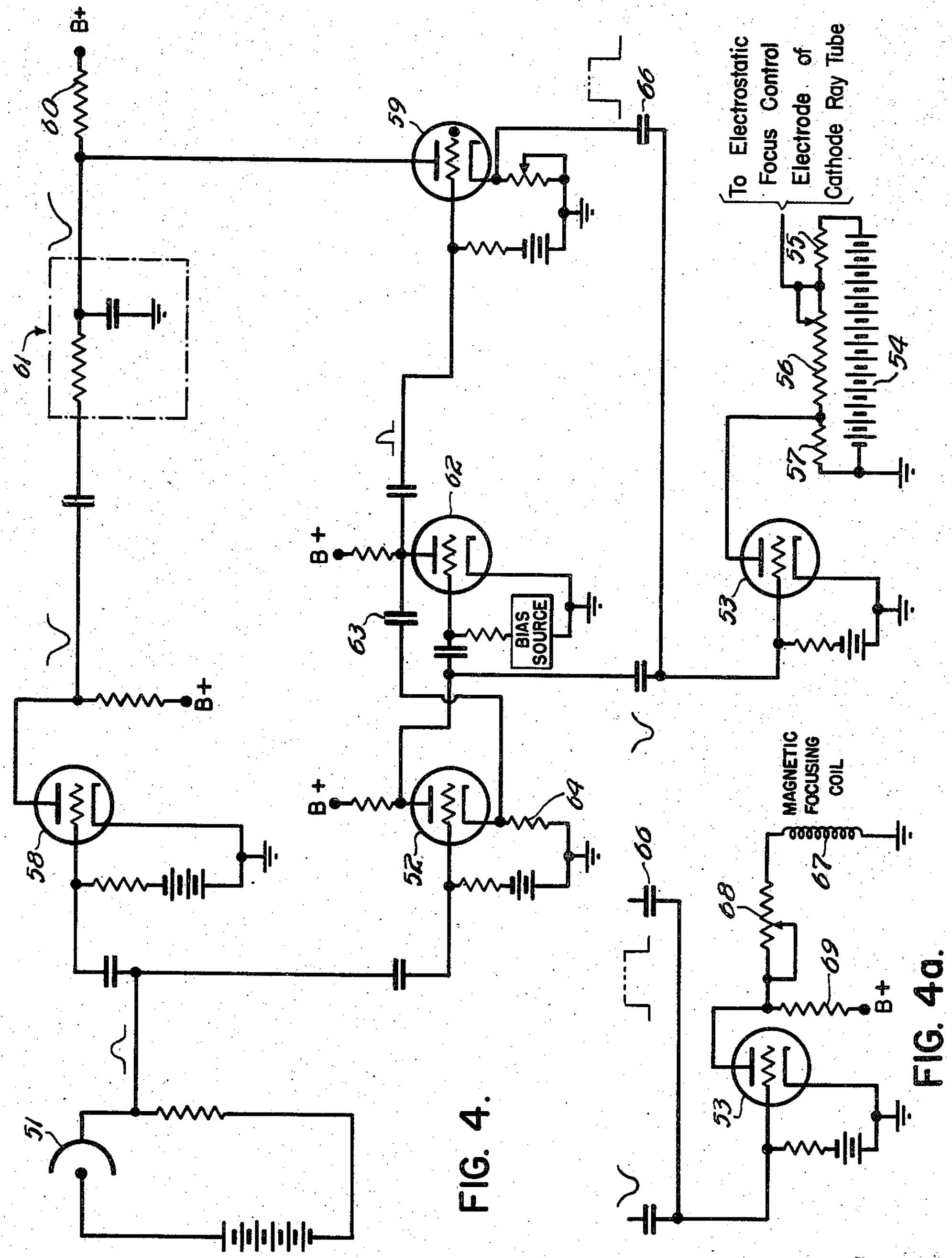
Fig. 4 is an example of a suitable circuit for block 13 of Fig. 1.

Fig. 4*a* is a modification of the circuit diagram of Fig. 4 whereby the circuit is adapted to control a magnetically focused cathode ray device. Fig. 4 as modified by Fig. 4*a* is an improvement on that shown in Fig. 2 within block 27.

Figures 1, 2, 3:
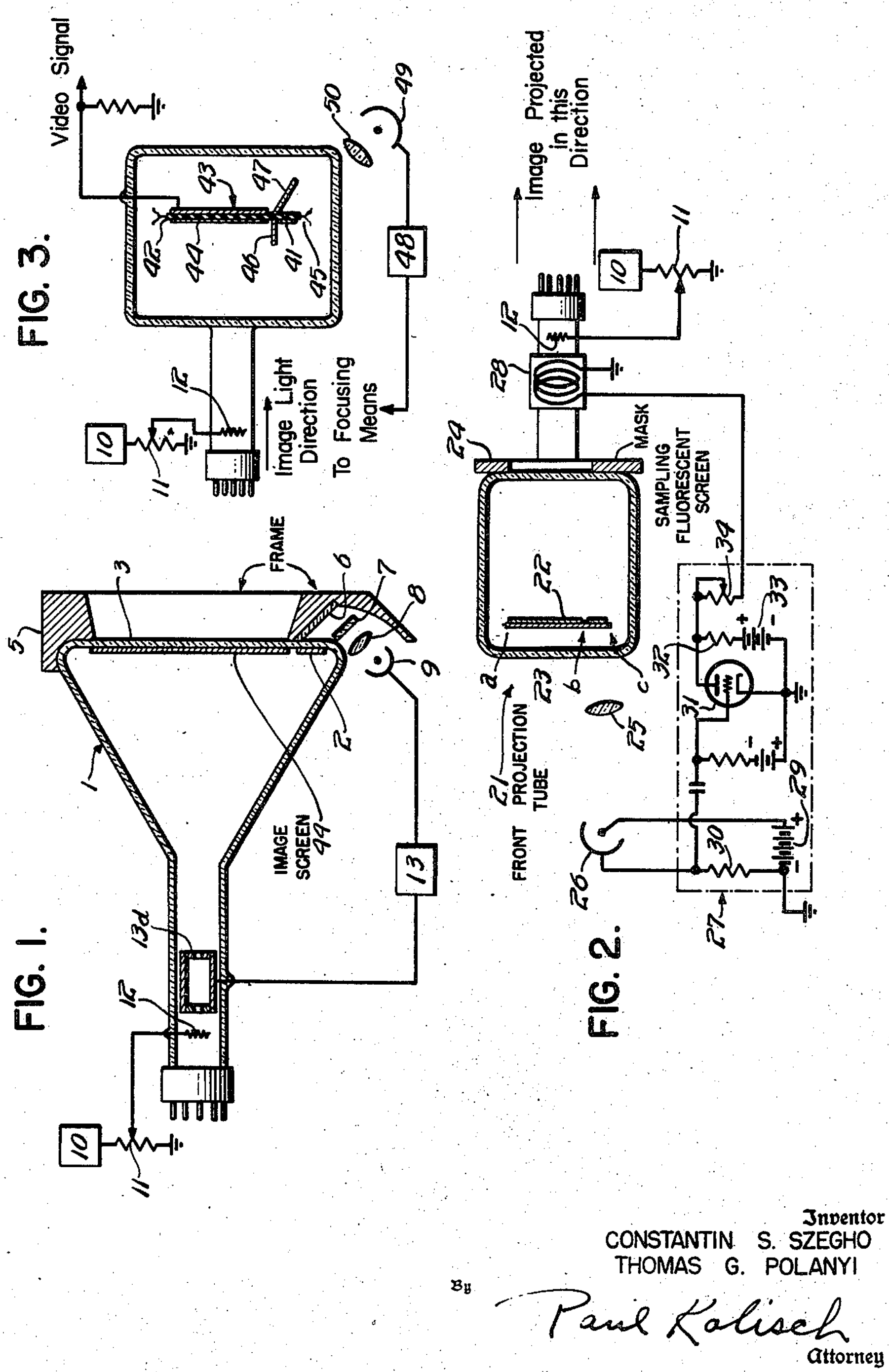
Fig. 1 is a diagrammatic representation of an embodiment of this invention in which the cathode ray device is an electrostatically focused direct viewing kinescope.
Fig. 2 is a diagrammatic representation of an embodiment of this invention in which the cathode ray device is a pipe-shaped first surface projection tube whose electron beam is magnetically focused.
Fig. 3 is a diagrammatic representation of an embodiment of this invention in which the cathode ray device is an iconoscope.

The embodiment shown in Fig. 1 employs a sampling fluorescent screen of the kind whose composition includes two powders which saturate at different levels of electron beam density per unit area and which emit light of different colors. The cross-sectional portion of Fig. 1 may be considered as taken in the plane which passes through the neck axis of cathode ray tube 1 and is parallel to its horizontal deflection plates, not shown (the deflection plates which are fed with low frequency sweep voltages). A narrow sampling fluorescent screen 2 extends along one edge of the viewing screen at the large end 3 of the tube with its longer dimension extending crosswise to the general direction of the high frequency sweeps. In the embodiment of Fig. 1 the starting point of each high frequency sweep is on the sampling fluorescent area and, after first sweeping across this area (moving upward on Fig. 1), the beam reaches and sweeps across image fluorescent screen 4. No picture signal should be fed to control grid 12, i. e. the electrode for intensity modulating the beam, until the beam has reached the image screen.

A frame 5 is set over the screen end of the viewing tube to mask its edges and to expose a picture area of any preferred shape, such as rectangular. One side of frame 5 completely masks the sampling fluorescent screen to prevent its light emissions from reaching the observers. A mirror 6 is carried in the rear surface of this side of frame 5 to catch these emissions and to reflect them into certain light intensity monitoring components. The purpose of this arrangement is to permit these monitoring components to be conveniently located behind the fluorescent screen rather than on the same side of it as observers. A color light filter 7 is interposed between mirror 6 and the monitoring components. It is selective to the color emitted by the saturating component of screen 2. Lens 8 gathers a substantial portion of the light emitted by screen 2 and reflected back through filter 7 by mirror 6 and projects it upon the light sensitive cathode of a photoelectric cell 9.

Block 10 represents a square wave pulse generator which operates in synchronism with the high frequency sweeps. Its output is fed through a potentiometer 11 to control grid 12 of tube 1. The purpose of pulse generator 10 is to provide means for energizing sampling fluorescent screen tube at a predetermined level as indicated above.

The output of photoelectric cell 9 is fed to block 13 which converts each change in photoelectric cell current produced by a defocusing of the beam into a change in the focusing voltage fed to focusing electrode 13*a* of tube 1, the direction of this change being in accordance with the direction of the current change.

In operation the apparatus of Fig. 1 may be adjusted as follows: With the sweep voltage sources disconnected or shut off and with the point of projection of the electron beam positioned on image fluorescent screen 4, the conventional focus and intensity control, which are not shown and may be manual controls of any known kind, are adjusted in accordance with usual standards until a spot of desired size and brightness is obtained. Free running sweeping is placed into operation and pulse generator 10 is turned on. Potentiometer 11 is slowly and progressively turned in the direction which increases the amplitude of the pulses fed to electrode 12. This should be done with frame 5 and mirror 6 removed. As the potentiometer is turned up it will be seen that the emissions from the sampling area will increase in intensity within certain limits and more particularly will undergo certain color changes. The color changes will depend on the kind of fluorescent powders employed in forming the sampling screen.

For example, an appropriate fluorescent powder may be a mixture of such a saturating component as zinc sulphide, which when it fluoresces produces blue light, and such a non-saturating component as beryllium silicate, which produces yellow light. With this mixture even if potentiometer 11 is linear and is turned up in a linear manner, yet when it is turned up beyond a certain point the rate of increase in the brightness of the blue emissions, i. e. those of the saturating component, will drop off sharply, and, if it had been linear up to that point, it will cease to be linear thereafter. The rate of increase in the brightness of the yellow component, however, will remain relatively constant well beyond that point. Therefore as the potentiometer is turned up the mixed color of the emissions will vary with the yellow portion thereof progressively predominating more and more. A second point may be reached at which the yellow component also saturates. Thereafter there will be no significant color changes or significant increases in the total level of emissions as the potentiometer is turned up even further. Of course, it should not be turned up enough to burn the screen. A proper operational adjustment of potentiometer 11 will be one which lies between these two points, i. e. in a region where one powder is saturated and the other is not. With the potentiometer set in this region diminutions in electron beam density per unit area which result from beam diffusion during defocusing will not lessen the brilliance of the blue emissions per unit area inasmuch as the zinc sulphide is already saturated, and, since a greater number of unit areas will be energized, the total of blue light emissions will increase. However, diminutions in electron beam density per unit area will reduce the brilliance of the yellow light emissions per unit area from the non-saturated beryllium silicate and this will more or less compensate for the fact that a larger number of unit areas is being bombarded. Therefore, any defocusing which occurs while potentiometer 11 is properly adjusted will cause the mixed color to change by increasing the ratio of blue emissions to yellow ones.

It is apparent that filter 7 is not essential, since the total mixed light will increase each time defocusing occurs and certainly the photocell may be adapted to respond to such increases. However, if filter 7 excludes yellow light from the photoelectric cell then changes which occur substantially only in the blue light during defocusing will be larger percentagewise with respect to the amount of light which actually reaches the photoelectric cell before defocusing and this will render the monitoring apparatus sensitive. At the same time the changes in color serve a useful purpose which is indicated below.

Obviously, for best results the photoelectric cell must be adjusted to optimum operating conditions as to its plate-to-cathode voltage and as to the normal amount of light it receives from the sampling screen. Its normal current during satisfactory focus should neither be as little as its dark current nor as large as its saturation current. When the photoelectric cell is properly adjusted the above-described changes in the level of blue emissions will cause useful changes in photoelectric cell 9. Each current change may be translated into a voltage change across an impedance in block 13 and this voltage change may be processed therein in an amplifier and/or other known circuit so that it may be utilized to effect on element 13*a* a focusing voltage change of appropriate magnitude and direction.

The embodiment shown in Fig. 2 differs from the embodiment of Fig. 1 primarily in the following: The cathode ray device in this case is a front projection tube; the sampling fluorescent screen uses what may be a less complex material which fluoresces in substantially the same color throughout its emission intensity range but has a definite saturation point; no color filter portion is included in its monitor apparatus; and its focusing is magnetic.

Front projection tube 21 may be of the type which projects fluorescent light from the same side of its fluorescent screen as that upon which the electron beam is projected. This type of construction is sometimes preferred because of greater useful light output. According to the well known construction of this kind of screen the image fluorescent screen 22 consists of a layer of fluorescent material which is deposited on what may be a non-transparent and even a metallic sheet support 23. In the drawing support 23 extends between points *a* and *b*. The sampling fluorescent screen consists of a layer of saturating powder placed on a strip of transparent material, such as glass, which may be physically attached to support 23 with one of its edges abutting against and extending along an edge thereof. Part of the figure represents a cross section taken in a plane parallel to the general direction of the high frequency sweeps and perpendicular to support 23. Therefore, as was explained in detail with respect to the embodiment of Fig. 1 and as is also true in this case, each high frequency sweep traverses both the sampling fluorescent screen and the image fluorescent screen. The sampling screen extends in width from *b* to *c*.

Frame 24 is an overlay which corresponds to frame 5 of Fig. 1 and serves a similar purpose, i. e. that of preventing light emissions from the sampling fluorescent screen to be projected upon the viewing screen while not interfering with facsimile projections. The exact choice of structure employed for a masking frame is no essential part of the invention, but may be made to depend on such considerations as economy, good appearance. For example, where a lens system is used to project upon a suitable screen the image produced by this kind of tube, the masking frame may be an opaque overlay properly applied to one side of one of the lenses of the system so as to block any emissions of light which originate from the sampling screen.

Lens 25 projects light from the sampling screen upon the light sensitive cathode of photoelectric cell 26. Block 27 receives the current output of photoelectric cell 26 and employs each increase therein caused by a defocusing of the beam to vary the magnitude of the current through focusing coil 28 in a direction to compensate for the change which caused defocusing. The circuit shown in block 27 comprises a source of potential 29 for energizing the photoelectric cell, a resistor 30 across which each increase in current through the photoelectric cell will produce an increased voltage drop, and a vacuum tube 31 whose internal impedance will be reduced with each increase in the voltage developed across resistor 30 and impressed between its control grid and cathode. Tube 31 performs its control function by being connected in shunt to a series circuit comprising a battery 33 and a voltage dropping resistor 32 which may be considered as together constituting a potential source for producing focusing coil current. This source forces focusing current through focusing coil 28 via an in-series manually controllable resistor 34. It is obvious that normal focusing current adjustments may be made by varying the setting of resistor 34. Automatic focusing adjustments are affected by tube 31 by its variations in internal impedance. Each time that the internal impedance of this tube drops it will draw a heavier current from the source supplying coil 28. This will increase the voltage drop across resistor 32 to decrease the potential impressed across the focusing coil via resistor 34 by an equal amount and thus to reduce the current passing through it.

Fig. 3 shows the application of the principles of this invention to an iconoscope. An iconoscope ordinarily has no light emitting element since it is adapted to receive light instead of to emit it. Therefore, sampling fluorescent screen 41, which is added to the structure of the tube according to this invention, may be the only fluorescent area included therein. The supporting structure for the mosaic may be a thin sheet of mica 42. Back plate 43 is the well known video signal pick-up element which is attached to the opposite side of the mica sheet from that on which the mosaic is placed and which is capacitively coupled to the mosaic. Mosaic 44 represents any conventional kind of mosaic. Wires 45 are the supporting means for the mica sheet and the elements attached to it. There are also added to the iconoscope, according to the present invention, a first light shield 46 and second light shield 47.

It is obvious that when the electron beam bombards nearby portions of sampling screen 41 light rays might reach the adjacent edge of mosaic 44. It is for this reason that shield 46 is required. Shield 47 is not equally essential but may serve a useful purpose in some applications where without it light from the sampling screen might reach and distract operators of the pick-up equipment.

Block 48 of Fig. 3 corresponds in purpose and function either to block 13 of Fig. 1 or block 27 of Fig. 2 depending on whether the tube is focused electrostatically or electromagnetically. As will be explained below, in either case block 48 may if desired comprise improved circuits shown in Fig. 4. The photoelectric cell 49 and the lens 50 shown in Fig. 3 correspond to the photoelectric cell and lenses employed in the other embodiments already described herein. The embodiment of Fig. 3 may be considered as employing a sampling screen, as in Fig. 2, which is composed of a single saturating fluorescent powder and is emissive in the same color over a wide range of electron bombardment intensities.

According to this invention defocusing is always indicated in but one way, i. e. by an increase in the light emitted from the focus sampling screen. However, each defocusing can be caused by either of two errors. More specifically each defocusing in the case of an electrostatically focused cathode ray tube may be due to a focusing voltage being either too high or too low and, in the case of an electromagnetically focused tube, to a focusing current being either too large or too small. Accordingly, it is essential to employ some means to cause the correcting circuits to act in the proper direction when they change the focusing potential of current. This may be done: (1) by adding some element which is capable of sensing the direction of the error when there is error; (2) by choosing as the normal operating value of the focusing voltage or current a value a little above or below the best possible one so that a variation of potential or current in one direction will actually improve focus slightly (and can be disregarded by the monitoring and correcting circuits) whereas any variation in the opposite direction will elicit a response and a correction; or (3) by including elements which are capable when defocusing is signalized of making a first quick trial correction in one direction and, whenever the trial correction aggravates the condition, of immediately thereafter switching to a second correction in the other direction. The circuit of block 27 of Fig. 2 falls in the second class and is adapted to make focus corrections in one direction only. Accordingly, the normal focusing current is a little above optimum and normally the electron beam will not be brought to the finest possible focus. If then the focusing circuit decreases for any reason, such as because of a drop in line voltage this will cause an improvement in focus and less average light will reach photocell 26. This will reduce the amplitude of the positive output voltage appearing across resistor 30 and fed to the grid of tube 31. Tube 31 is normally biased to remain cut off when the voltage across resistor 30 is that produced by the photoelectric cell circuit when the light from the sampling fluorescent screen indicates focusing which is normal or better than normal. Obviously, when the voltage across resistor 30 goes down tube 31 will remain cut off and no change will occur in the focusing current. However, should there be an undesired increase in focusing current, it will accentuate the original defocusing; there will be an increase in the light emissions from the sampling screen; the voltage across 30 will increase above normal; tube 31 will start to draw current; and, in the manner indicated above, its shunt impedance effect will be to reduce the focusing current.

The circuit of Fig. 4 falls into the third class and therefore permits normal focus to be the most accurate possible. This circuit is arranged to make focusing corrections in whichever direction focusing errors occur from that optimum point. The output of photocell 51 is always positive though, of course, if desired it can be inverted and made negative by the inclusion of a stage of amplification. The positive output of photoelectric cell 51 is fed to two amplifier tubes, and one of these, tube 52, after amplifying and inverting the output of the photoelectric cell applies it directly to shunt tube 53 to increase its internal impedance. The source of focusing voltage comprises battery 54 and a voltage divider including three in-series resistors 55, 56, 57 connected across its terminals the focusing voltage being taken off at the juncture between resistors 55 and 56. Since tube 53 is in shunt to resistor 57, its variations in internal impedance will dynamically affect the value of the focusing voltage in an obvious manner. Resistor 56 is manually variable to permit static adjustments. Photoelectric cell 51 also feeds its positive voltage to the control grid of quenching tube 58. This voltage is inverted and amplified and applied to the anode of a gas tube 59 where it will have no effect since the gas tube is not in its ionized condition. An integrating circuit 61, or an appropriate delay network, is interposed between the anode of quenching tube 58 and that of gas tube 59, so that quenching voltages will be applied from tube 58 to the gas tube a little later in time than the time of their generation by the photoelectric tube. The reason for this will be explained below.

The negative output of tube 52 in addition to being applied to shunt tube 53, is also applied to the control grid of trigger tube 62. This tube normally operates with its grid potential above the anode current saturation point so that small negative signals on its control grid will not produce any output signal. Assuming that a defocusing is caused by a drop in the focusing voltage then, since the combined action of tube 52, shunt tube 53, and voltage divider 55, 56, 57 is to increase the focusing voltage, the defocusing will be corrected soon after it is monitored. Thus, the positive signal at the output of photoelectric cell 51 and the negative one at the output of tube 52 would very soon be reduced in magnitude so that tube 53 would continue to receive no input signal of sufficient magnitude to produce a positive output signal. If, however, the defocusing was caused by an increase in the focusing voltage, the initial "correction" would be in the wrong direction. This would aggravate defocusing to increase both the positive output of photoelectric cell 51 and the negative output of tube 52. Of course, this increased output from tube 52 will tend to carry this process even further by acting on shunt tube 53 to even further aggravate defocusing. However, as will be seen below, trigger tube 62 is adapted to arrest this process before it goes very far. Soon after this process has started the output of tube 52 will be large enough to produce an output signal from trigger tube 62, i. e. to reduce its anode currents somewhat below the saturation level. Therefore, a positive signal will be fed back over blocking condenser 63 to the cathode of tube 52 which is connected to ground over a resistor 64 rather than directly. This will cause the cathode to move up in potential and will reduce or entirely eliminate the positive signal impressed between the control grid and cathode of tube 52 thus ending the process of defocusing aggravation as well as abruptly depriving tube 62 of its input signal. In the meanwhile however, the transient positive output of tube 62 will have fired gas tube 59. The large increase of anode-cathode current through the gas tube will produce a positive signal across its cathode resistor 65. This positive signal is applied over blocking condenser 66 to the grid of shunt tube 53 to lower its internal impedance to increase the focusing voltage. The gas tube, once it has fired will continue to do so because of the well known fact that its control grid will lose control. Moreover, because of the delay network 61 the output of tube 58 will not quench gas tube 59 before it has had time to act to reduce the defocusing. Quenching tube 58 will be assisted in quenching the gas tube by a preparatory potential drop which will occur across resistor 60 when tube 59 fires. Should tube 58 for any reason fail to quench the gas tube then the defocusing will be overcorrected and tube 58 will produce another quenching output signal deionizing the gas tube and restoring the circuit to its original condition. Obviously, in operation this circuit would cause the focusing to hunt about in the region of optimum focus. By proper selection and adjustment of the values of circuit elements this hunting can be confined to a narrow region wherein the beam focus will never be inferior to a predetermined standard.

Fig. 4*a* shows modification of the circuit of Fig. 4 whereby it is adapted to effect corrections in systems which are electromagnetically focused. Focusing coil 67 derives its focusing current from the B+ source of tube 53 over an adjustable resistor 68 and the anode resistor 69 of tube 53. Normal static adjustments of focusing current may be effected by manually changing the setting of adjustable resistor 68. Automatic changes in current will be effected by variations in the internal impedance of shunt tube 53. It will be noted that when tube 52 acts to increase the internal impedance of tube 53 and decrease its anode current, the potential available at the upper end of anode-resistor 69 will rise and this will cause an increase in focusing current. Conversely the positive output of gas tube 57 will act through shunt tube 53 to decrease focusing current.

It is obvious that focus control apparatus according to this invention can be employed for other types of cathode ray devices than those which are shown herein and in fact for any cathode ray device having a focused beam of electrons. For example, sampling fluorescent screens as well as cooperating monitoring elements and control circuits may be readily employed, on the one hand, for a wide variety of pick-up devices including dissector tubes, two-sided mosaic iconoscopes, orthocon tubes, barrier grid tubes, etc. and, on the other hand, for a wide variety of picture tubes including direct viewing tubes, first and second surface projection tubes, and tubes whose target instead of fluorescing under electron bombardment varies in its opacity and can be used to modulate light from a separate source in a manner corresponding to the projection of light through a moving picture film.

Obviously, for certain embodiments the simple two-electrode photoelectric tube may be replaced by an electron-multiplier photoelectric tube, which, as is well known, has far greater sensitivity to light and to light changes.

What is claimed is:

1. Electron beam focus control apparatus comprising fluorescent screen, a source of electrons, means for focusing the electron beam on the screen to form a light spot generating a certain amount of light, means comprising a saturating fluorescent material on the fluorescent screen for increasing said amount of light if an error occurs in the focusing means whereby the density of the light spot on the screen is maintained constant, and control means for compensating for said error in the focusing means.

2. An apparatus according to claim 1, and in which the control means comprises photoelectric means responsive to the increase of said amount of light for producing control voltages, and control means comprising a first circuit responsive to said control voltages for effecting a trial change in said focusing means and a second circuit unresponsive to control voltages if said trial change is in the right direction to compensate for the error in the focusing means and responsive thereto if said trial change is in the opposite direction, said circuit effecting a change in said focusing means in the right direction.

3. In a television apparatus, a cathode ray tube having a source of electrons, a screen comprising an image fluorescent portion and a strip-like sampling fluorescent portion abutting along one edge against said image portion, means for focusing the electron beam on the screen to generate a certain amount of light on said strip-like sampling portion, means for increasing said amount of light if an error occurs in the focusing means and control means responsive to the amount of light generated in said sampling portion for compensating for said error in the focusing means.

4. In a television apparatus, a cathode ray tube according to claim 3, and in which the image fluorescent portion is a photoemissive area.

5. In a television apparatus, a cathode ray tube according to claim 3, and in which the means for increasing said amount of light comprises a saturating fluorescent material applied to the sampling fluorescent portion whereby the density of the light spot on said sampling portion is maintained constant if an error occurs in the focusing means.

CONSTANTIN S. SZEGHO.
THOMAS G. POLANYI.

REFERENCES CITED

The following references are of record in the file of this patent:

UNITED STATES PATENTS

| Number | Name | Date |
|---|---|---|
| 1,976,400 | Ilberg | Oct. 9, 1934 |
| 2,077,442 | Tedham et al. | Apr. 20, 1937 |
| 2,096,985 | Von Ardenne | Oct. 26, 1937 |
| 2,134,851 | Blumlein | Nov. 1, 1938 |
| 2,307,212 | Goldsmith | Jan. 5, 1943 |
| 2,310,671 | Batchelor | Feb. 9, 1943 |
| 2,398,642 | Homrighous | Apr. 16, 1946 |
| 2,430,331 | Galella et al. | Nov. 4, 1947 |
| 2,447,804 | Holst | Aug. 24, 1948 |